(12) United States Patent
Ito et al.

(10) Patent No.: US 8,720,658 B2
(45) Date of Patent: May 13, 2014

(54) STARTING DEVICE AND DAMPER DEVICE FOR USE THEREIN

(75) Inventors: Kazuyoshi Ito, Anjo (JP); Akihiro Nagae, Anjo (JP); Yoshihide Mori, Anjo (JP); Keizo Araki, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 275 days.

(21) Appl. No.: 13/200,752

(22) Filed: Sep. 30, 2011

(65) Prior Publication Data

US 2012/0111683 A1     May 10, 2012

Related U.S. Application Data

(63) Continuation-in-part of application No. 13/228,050, filed on Sep. 8, 2011, now abandoned.

(30) Foreign Application Priority Data

Sep. 30, 2010 (JP) ................................ 2010-221024

(51) Int. Cl.
*F16H 45/02* (2006.01)

(52) U.S. Cl.
USPC ...... 192/3.29; 74/574.2; 192/30 V; 192/55.61

(58) Field of Classification Search
USPC .......................................... 60/338; 74/574.2
See application file for complete search history.

(56) References Cited

U.S. PATENT DOCUMENTS

| 6,026,940 | A  | 2/2000 | Sudau |
| 6,688,441 | B1 | 2/2004 | Arhab et al. |
| 8,161,739 | B2 | 4/2012 | Degler et al. |
| 8,342,306 | B2 | 1/2013 | Werner et al. |
| 8,403,762 | B2 | 3/2013 | Steinberger |
| 2004/0226794 | A1 | 11/2004 | Sasse et al. |
| 2009/0125202 | A1 | 5/2009 | Swank et al. |
| 2010/0236228 | A1 | 9/2010 | Degler et al. |

(Continued)

FOREIGN PATENT DOCUMENTS

| DE | 10 2009 042 837 A1 | 4/2010 |
| DE | 10 2009 002 481 A1 * | 6/2010 |

(Continued)

OTHER PUBLICATIONS

International Search Report for corresponding International Patent Application No. PCT/JP2011/072282 mailed Dec. 13, 2011.

(Continued)

*Primary Examiner* — Rodney Bonck
(74) *Attorney, Agent, or Firm* — Sughrue Mion, PLLC

(57) ABSTRACT

A starting device includes: a lock-up clutch mechanism; a fluid coupling; a spring damper including a spring, a power transfer portion transferring power from the lock-up clutch mechanism to the spring, and a power output portion transferring power from the spring to an input shaft; and a pendulum damper including a pendulum and a pendulum power transfer portion transferring power from the spring damper to the pendulum. The output portion of the lock-up clutch, the pendulum damper, the spring damper, and the fluid coupling are arranged sequentially in this order from a motor in the axial direction. The lock-up clutch mechanism output and the spring damper output are connected to each other on the outer circumferential side of the pendulum damper, and the spring damper output and the pendulum power transfer portion are connected to each other on the inner circumferential side of the pendulum.

4 Claims, 4 Drawing Sheets

(56) References Cited

U.S. PATENT DOCUMENTS

| | | | |
|---|---|---|---|
| 2011/0031083 A1 | 2/2011 | Matsuoka et al. | |
| 2011/0192692 A1 | 8/2011 | Werner et al. | |
| 2011/0240429 A1* | 10/2011 | Heuler et al. | 192/3.28 |
| 2012/0080280 A1 | 4/2012 | Takikawa et al. | |
| 2012/0080281 A1* | 4/2012 | Takikawa et al. | 192/3.28 |
| 2012/0080282 A1* | 4/2012 | Takikawa et al. | 192/3.28 |
| 2012/0111683 A1 | 5/2012 | Ito et al. | |

FOREIGN PATENT DOCUMENTS

| | | |
|---|---|---|
| JP | 10-169756 A | 6/1998 |
| JP | 2004-308904 A | 11/2004 |
| JP | 2009-115112 A | 5/2009 |
| JP | 2009-243536 A | 10/2009 |
| JP | 2009-293671 A | 12/2009 |
| WO | 2009/067987 A1 | 6/2009 |
| WO | 2010/000220 A1 | 1/2010 |
| WO | 2010/043194 A1 | 4/2010 |
| WO | 2010/066665 A1 | 6/2010 |

OTHER PUBLICATIONS

U.S. Appl. No. 13/234,736, filed by Yoshihiro Takikawa on Sep. 16, 2011.
International Search Report for corresponding International Patent Application No. PCT/JP2011/071368 mailed Dec. 20, 2011.
International Search Report for corresponding International Patent Application No. PCT/JP2011/071369 mailed Dec. 20, 2011.
International Search Report for corresponding International Patent Application No. PCT/JP2011/071455 mailed Dec. 27, 2011.
U.S. Appl. No. 13/233,637, filed by Yoshihiro Takikawa on Sep. 15, 2011.
U.S. Appl. No. 13/222,712, filed by Yoshihiro Takikawa on Aug. 31, 2011.

* cited by examiner

STARTING DEVICE AND DAMPER DEVICE FOR USE THEREIN

INCORPORATION BY REFERENCE

The disclosure of Japanese Patent Application No. 2010-221024 filed on Sep. 30, 2010 including the specification, drawings and abstract is incorporated herein by reference in its entirety.

BACKGROUND OF THE INVENTION

The present invention relates to a starting device that is disposed between a motor and a transmission.

DESCRIPTION OF THE RELATED ART

Hitherto, there has been known a configuration in which a damper device that relieves and absorbs impact torque or the like is disposed on a motor side with respect to a turbine runner of a starting device in the axial direction (see Japanese Patent Application Publication No. 2009-243536, for example). In such a configuration, however, a space on the outer circumferential side of the turbine runner creates a dead space, and may not be utilized effectively.

In order to effectively utilize such a dead space, there has been developed a configuration in which a new damper forming element is disposed in a space on the outer circumferential side of a turbine runner so as to partially overlap the turbine runner in the axial direction (see International Patent Application Publication No. 2010/000220 (FIG. 1), for example).

SUMMARY OF THE INVENTION

In the configuration described in International Patent Application Publication No. 2010/000220, the new damper forming element is provided adjacently on the turbine runner side with respect to a centrifugal pendulum damper in the axial direction, and a power transfer path from a lock-up clutch to the new damper forming element passes through the inner circumferential side of the centrifugal pendulum damper. In such a configuration, it is necessary to form a space for securing the movable range of the new damper forming element in a member (damper plate) that supports a pendulum of the centrifugal pendulum damper, which is disadvantageous in terms of strength. In addition, the movable range of the pendulum of the centrifugal pendulum damper is constrained by a need to prevent interference between the pendulum and a coupling member that forms the power transfer path from the lock-up clutch to the new damper forming element. Thus, the degree of freedom in design (such as mass and arrangement, for example) of the pendulum of the centrifugal pendulum damper may be low.

It is therefore an object of the present invention to provide a starting device which enables improvement of the strength of a damper plate and so forth and the degree of freedom in design of a pendulum of a centrifugal pendulum damper while effectively utilizing a space on the outer circumferential side of a turbine runner.

In order to achieve the foregoing object, an aspect of the present invention provides a starting device including:

a lock-up clutch mechanism that mechanically transfers power from a motor to an input shaft of a transmission;

a fluid coupling including a turbine runner and a pump impeller to transfer power from the motor to the input shaft via a fluid;

a spring damper including a spring, a power transfer portion that transfers power from an output portion of the lock-up clutch mechanism to the spring, and a power output portion that transfers power of the spring to the input shaft; and a pendulum damper including a pendulum and a pendulum power transfer portion that transfers power from the power output portion of the spring damper to the pendulum, wherein the output portion of the lock-up clutch mechanism, the pendulum damper, the spring damper, and the fluid coupling are arranged sequentially in this order from the motor in an axial direction, and the output portion of the lock-up clutch mechanism and the power transfer portion of the spring damper are connected to each other on an outer circumferential side of the pendulum damper, and the power output portion of the spring damper and the pendulum power transfer portion are connected to each other on an inner circumferential side of the pendulum.

According to the aspect of the present invention, a starting device which enables improvement of the strength of a damper plate and so forth and the degree of freedom in design of a pendulum of a centrifugal pendulum damper while effectively utilizing a space on the outer circumferential side of a turbine runner can be provided.

DETAILED DESCRIPTION OF THE EMBODIMENTS

Embodiments of the present invention will be described below with reference to the drawings.

Figure 1:
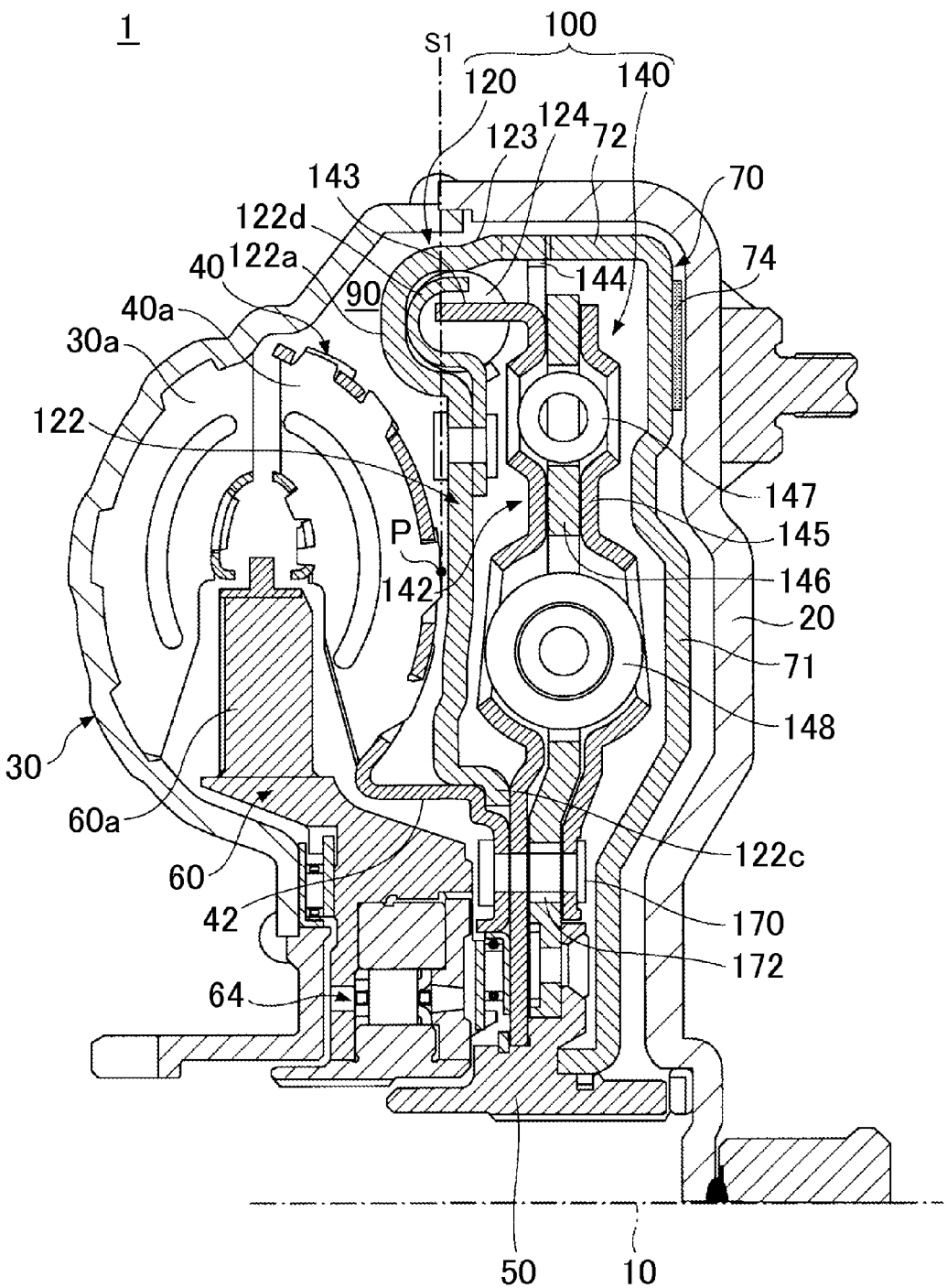
FIG. 1 is a cross-sectional view showing the configuration of an essential portion of a starting device 1 according to Reference Example 1.

FIG. 1 is a cross-sectional view showing the configuration of an essential portion of a starting device 1 according to Reference Example 1. In FIG. 1, the upper half of a cross section of the starting device 1 (the upper half above an input shaft 10) is shown. In the following description, the term "axial direction" refers to the direction of the input shaft 10 of a transmission (the left-right direction of FIG. 1), and the term "radial direction" refers to the radial direction around the input shaft 10 of the transmission (the direction perpendicular to the input shaft 10; the up-down direction of FIG. 1, for example) as viewed along the input shaft 10 of the transmission. Thus, the term "radially outer side" or "outer circumferential side" refers to the side away from the input shaft 10 in the direction perpendicular to the input shaft 10, and the term "radially inner side" refers to the side toward the input shaft 10 in the direction perpendicular to the input shaft 10.

The starting device 1 is also referred to a "torque converter", and disposed between a motor and the transmission of a vehicle. The motor is typically any type of engine. The starting device 1 outputs power input from the motor to the input shaft 10 of the transmission. The power input to the input shaft 10 of the transmission is transferred to a propeller shaft via a planetary gear unit, for example. The transmission may be of any type such as an automatic transmission (AT) and a continuously variable transmission (CVT).

The starting device 1 includes, as its main constituent elements, a front cover 20, a pump impeller 30, a turbine runner 40, a turbine hub 50, a stator 60, a lock-up clutch mechanism 70, and a damper device 100.

The front cover 20 is an input member of the starting device 1, and is connected to the motor (not shown) positioned on the right side of FIG. 1. That is, the front cover 20 receives power from the motor via a drive plate (not shown). The front cover 20 is connected to the pump impeller 30 in a manner that enables transfer of rotational torque to the pump impeller 30. Specifically, as shown in FIG. 1, an end portion of an outer circumferential wall of the front cover 20 is fixed to an edge portion of the pump impeller 30 on the radially outer side. The pump impeller 30 includes a plurality of blades 30a.

The turbine hub 50 is an output member of the starting device 1, and is connected (for example, splined) to the input shaft 10 of the transmission. The turbine runner 40 is connected to the turbine hub 50. More specifically, a radially inner end portion of a runner shell 42 of the turbine runner 40 is connected to the turbine hub 50 via a second damper plate 142 in a manner that enables transfer of rotational torque to the turbine hub 50. The turbine runner 40 includes a plurality of blades 40a that face the plurality of blades 30a of the pump impeller 30 in the axial direction. The stator 60, which includes a plurality of blades 60a, is disposed between the turbine runner 40 and the pump impeller 30. The stator 60 is supported by a one-way clutch 64 so as to be rotatable only in one direction about the input shaft 10.

The lock-up clutch mechanism 70 includes a piston (clutch plate) 71, a radially inner end portion of which is supported by the turbine hub 50, and a lock-up clutch 74 provided radially outwardly of the piston 71. The piston 71 is slidably supported by the turbine hub 50, and is rotatable about the input shaft 10. The piston 71 is also movable along the axial direction. The lock-up clutch 74 produces a friction force with the front cover 20 when the lock-up clutch mechanism 70 is actuated. The lock-up clutch mechanism 70 may be actuated by a flow of a fluid. Specifically, when the lock-up clutch mechanism 70 is not actuated, the piston 71 is pulled away from the front cover 20 by the flow of the fluid so that no friction force is produced by the lock-up clutch 74. When the lock-up clutch mechanism 70 is actuated, the flow of the fluid is reversed by switching a control valve (not shown) so that the piston 71 and the lock-up clutch 74 are pressed toward the front cover 20. This causes the lock-up clutch 74 to produce a friction force, which causes the piston 71 to rotate about the input shaft 10 together with the front cover 20.

The damper device 100 is disposed between the lock-up clutch mechanism 70 and the turbine hub 50. The damper device 100 relieves and absorbs impulsive input torque and torque fluctuations transferred from the lock-up clutch 74 to the turbine hub 50 when the lock-up clutch mechanism 70 is actuated. The configuration of the damper device 100 will be described in detail later.

The outline of an operation of the starting device 1 will be described. When an engine operates, the front cover 20 and the pump impeller 30 are rotated accordingly. When the pump impeller 30 is rotated, a fluid near the center of the pump impeller 30 is urged toward the turbine runner 40 along the blades 30a and the wall to cause the turbine runner 40 to start rotating. The stator 60 is stationary when the difference in rotational speed between the pump impeller 30 and the turbine runner 40 is large. Thus, the stator 60 varies the direction of the fluid, and increases rotational torque as rotation of the pump impeller 30 accelerates (converter range). When the rotational speed of the turbine runner 40 becomes higher, on the other hand, the stator 60 idles by the action of the one-way clutch 64 not to hinder the flow of the fluid (coupling range). Thus, the stator 60 transfers rotational torque as it is to the turbine runner 40 when the difference in rotational speed between the pump impeller 30 and the turbine runner 40 is small.

In the case where the rotational speed of the turbine runner 40 becomes higher and predetermined conditions are met (for example, in the case where the vehicle speed reaches a predetermined speed, or in the case where the stator 60 starts idling (coupling range)), the lock-up clutch mechanism 70 is actuated. When the lock-up clutch mechanism 70 is actuated, power transmitted from the motor to the front cover 20 is mechanically transferred to the turbine hub 50 as discussed above. That is, the power transmitted from the motor to the front cover 20 is mechanically transferred from the lock-up clutch 74 to the turbine hub 50 via the damper device 100. In this event, the damper device 100 absorbs fluctuations in torque transferred from the front cover 20 to the turbine hub 50.

Figure 2:
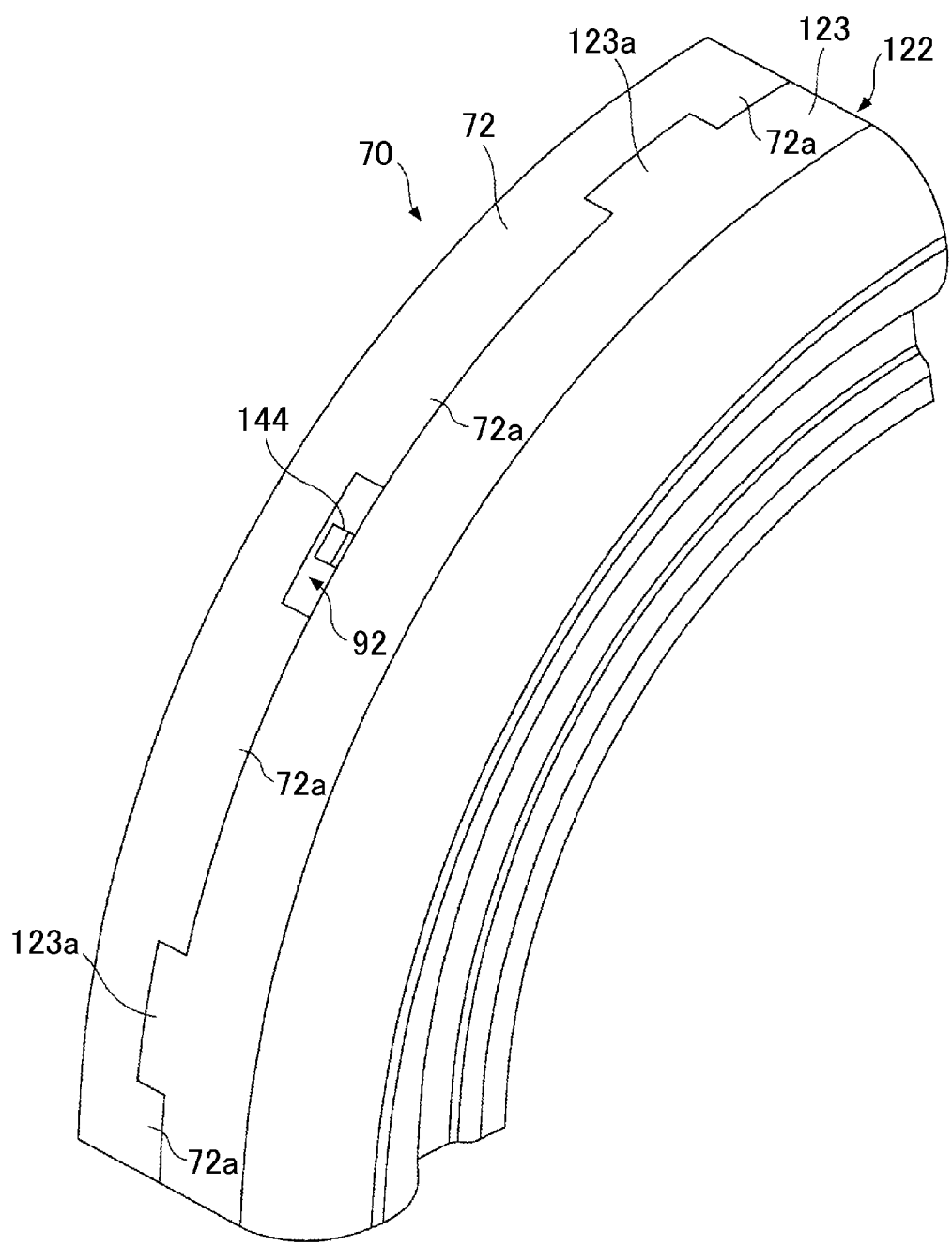
FIG. 2 is a perspective view showing a connection portion between a piston 71 and a first damper 120 shown in FIG. 1.

Next, the configuration of the damper device 100 will be described in detail with reference to FIGS. 1 and 2. FIG. 2 is a perspective view showing a connection portion between the piston 71 and a first damper 120 shown in FIG. 1.

As shown in FIG. 1, the damper device 100 includes the first damper 120 and a second damper 140.

The first damper 120 is at least partially provided in a space 90 (hereinafter referred to as "dead space 90") on the outer circumferential side of the turbine runner 40. In the dead space 90, the first damper 120 at least partially overlap the turbine runner 40 in the axial direction. In Reference Example 1, as shown in FIG. 1, a part of a first spring 124 of the first damper 120 (a portion on the turbine runner 40 side in the axial direction) is disposed in the dead space 90 to overlap the turbine runner 40 in the axial direction. Here, as shown in FIG. 1, the dead space 90 may be defined as a space defined by a plane S1 extending in the radial direction and including a point P of the turbine runner 40 that is closest to the motor in the axial direction, the runner shell 42 of the turbine runner 40, and the inner surface of the starting device 1 (in Reference Example 1, the inner surface of an impeller shell of the pump impeller 30). It should be particularly noted that the point P is provided on a portion of the turbine runner 40 that is convexly curved toward the motor (a portion formed with the blades 40a), and not provided on a portion of the turbine runner 40 for attachment on the turbine hub 50 side.

The first damper 120 is provided between the lock-up clutch 74 and the second damper 140 from the viewpoint of power transfer path. The first damper 120 receives power from the lock-up clutch 74 to transfer the power to the second damper 140.

The first damper 120 includes a first damper plate 122 and the first spring 124. As shown in FIG. 1, the first damper plate 122 has a generally disk-like shape with a hole provided on the radially center side. The first damper plate 122 includes a spring holding portion 122a that holds the first spring 124, a radially inner end portion 122c, and an outer circumferential edge portion 123 on the radially outer side. The radially inner end portion 122c of the first damper plate 122 is held between the runner shell 42 of the turbine runner 40 and the second damper plate 142 of the second damper 140 in the axial direction. With such a support structure, the radially inner end portion 122c of the first damper plate 122 is centrally aligned to facilitate assembly with the first damper plate 122 appropriately centrally aligned with respect to the axis of the turbine hub 50.

As shown in FIGS. 1 and 2, the outer circumferential edge portion (power transfer portion) 123 of the first damper plate 122 is connected to an outer circumferential edge portion 72 of the piston 71 in a manner that enables transfer of rotational torque. As shown in FIG. 1, the outer circumferential edge portion 123 of the first damper plate 122 and the outer circumferential edge portion 72 of the piston 71 extend in the axial direction so as to surround the second damper 140 from the radially outer side. As shown in FIG. 2, the outer circumferential edge portion 123 of the first damper plate 122 includes a plurality of teeth 123a that project in the axial direction toward the piston 71. The plurality of teeth 123a are arranged at predetermined intervals along the circumferential direction of the outer circumferential edge portion 123. Correspondingly, as shown in FIG. 2, the outer circumferential edge portion 72 of the piston 71 includes a plurality of teeth 72a that project in the axial direction toward the first damper plate 122. The plurality of teeth 72a are arranged at predetermined intervals along the circumferential direction of the outer circumferential edge portion 72. The plurality of teeth 123a of the first damper plate 122 of the first damper 120 are respectively arranged to be fitted between the plurality of teeth 72a of the piston 71. Thus, the first damper plate 122 of the first damper 120 and the piston 71 are connected to each other with the plurality of teeth 123a of the first damper plate 122 of the first damper 120 and the plurality of teeth 72a of the piston 71 meshing with each other. The plurality of teeth 123a of the first damper plate 122 of the first damper 120 and the plurality of teeth 72a of the piston 71 mesh with each other with backlash (clearance) in the circumferential direction. Such backlash is provided to allow the radially inner end portion 122c of the first damper plate 122 to be held between the runner shell 42 of the turbine runner 40 and the second damper plate 142 of the second damper 140.

Preferably, as shown in FIG. 2, a stopper movable space 92 is formed in a part of spaces between (a plurality of) adjacent teeth 72a of the piston 71. That is, in the illustrated example, a local toothless portion is provided among the plurality of teeth 123a of the first damper plate 122 of the first damper 120 for the plurality of teeth 72a of the piston 71, and the stopper movable space 92 is formed for the toothless portion. The function of the stopper movable space 92 will be discussed later.

The first spring 124 is disposed generally along the circumferential direction on the first damper plate 122 of the first damper 120. Typically, a plurality of first springs 124 are disposed generally along the circumferential direction on the first damper plate 122 of the first damper 120. In the illustrated example, the first spring 124 is held from the turbine runner 40 side by the spring holding portion 122a of the first damper plate 122 which extends from the outer circumferential edge portion 123 toward the turbine runner 40. An end portion of the first spring 124 in the circumferential direction is supported by a member 122d fixed to the first damper plate 122.

The second damper 140 includes the second damper plate 142, a third damper plate 145, an intermediate plate 146, a second spring 147, and a third spring 148.

The second damper plate 142 is disposed on the turbine runner 40 side in the axial direction with respect to the third damper plate 145. The second damper plate 142 and the third damper plate 145 have a generally disk-like shape with a hole provided on the radially center side. The second damper plate 142 and the third damper plate 145 are connected to the intermediate plate 146 so as to be relatively rotatable about the axis of the turbine hub 50 with respect to the intermediate plate 146. Specifically, the second damper plate 142 and the third damper plate 145 are fixed to each other by a rivet 170. A cylindrical sleeve 172 is mounted on the rivet 170. The sleeve 172 secures the movable range of the intermediate plate 146.

The second damper plate 142 includes a spring engagement hook 143 provided at the radially outer end portion to project toward the turbine runner 40 in the axial direction. The spring engagement hook 143 engages, in the circumferential direction, with a circumferential end portion (seat portion) of the first spring 124 of the first damper 120. The second damper plate 142 receives power from the first damper 120 via the spring engagement hook 143.

A stopper portion 144 extending radially outward is formed as an optional component at the outer circumferential edge portion of the second damper plate 142. As shown in FIG. 2, the stopper portion 144 extends into the stopper movable space 92 defined along the circumferential direction between the adjacent teeth 72a of the piston 71. The stopper movable space 92 prescribes the movable range of the stopper portion 144 along the circumferential direction. Thus, rotation of the second damper plate 142 is restrained with the stopper portion 144 abutting, in the circumferential direction, against one of the adjacent teeth 72a of the piston 71 defining the stopper movable space 92. Such a mechanical stopper function implemented by the stopper portion 144 may function for impulsive input that exceeds the normal range, for example.

Such a stopper portion 144 may be disposed further radially outward. This makes it possible to reduce the rigidity of the damper plates (such as the second damper plate 142) provided in the power transfer path when the stopper portion 144 is in operation. This also makes it possible to efficiently implement the stopper function by utilizing a part of the meshing portion between the plurality of teeth 123a of the first damper 120 and the plurality of teeth 72a of the piston 71.

The intermediate plate 146 shown in FIG. 1 has a generally disk-like shape with a hole provided on the radially center side as a whole. The intermediate plate 146 is provided between the second damper plate 142 and the third damper plate 145 in the axial direction. A radially inner end portion of the intermediate plate 146 is connected to the turbine hub 50. Thus, the intermediate plate 146 rotates together with the turbine hub 50.

The second spring 147 and the third spring 148 are disposed generally along the circumferential direction on the intermediate plate 146 between the second damper plate 142 and the third damper plate 145 in the axial direction. Typically, a plurality of second springs 147 and a plurality of third springs 148 are disposed along the circumferential direction. The second spring 147 is disposed radially outwardly of the third spring 148. In the illustrated example, the second spring 147 is disposed at a radial position between the third spring 148 and the first spring 124 of the first damper 120 in the radial direction. In addition, the second spring 147 is disposed on the motor side in the axial direction with respect to the first spring 124 of the first damper 120. Thus, the second spring 147 is not positioned in the dead space 90 discussed above. The positional relationship among the first, second, and third springs 124, 147, and 148 may be determined on the basis of the position of the center axis of each spring (coil center axis) as viewed in cross section. The second spring 147 and the third spring 148 demonstrate their elastic/damping action on relative rotation of the second damper plate 142 and the third damper plate 145 with respect to the intermediate plate 146 about the axis of the turbine hub 50. The second spring 147 and the third spring 148 may be different from each other in configuration (such as elastic and physical characteristics).

The second spring 147 and the third spring 148 may be configured to act in different stages during relative rotation of the second damper plate 142 and the third damper plate 145 with respect to the intermediate plate 146 about the axis of the turbine hub 50.

In the damper device 100, power from the lock-up clutch 74 is transferred from the outer circumferential edge portion 72 of the piston 71 to the first damper 120 (the outer circumferential edge portion 123 of the first damper plate 122). The power received from the outer circumferential edge portion 123 of the first damper plate 122 is transferred to the second damper 140 (the spring engagement hook 143 of the second damper plate 142) via the first spring 124 of the first damper 120. The power received from the spring engagement hook 143 of the second damper plate 142 is transferred to the intermediate plate 146 of the second damper 140 and the turbine hub 50 via the second spring 147 and the third spring 148. In this way, power is transferred from the lock-up clutch 74 to the turbine hub 50 via the damper device 100.

The damper device 100 according to Reference Example 1 includes two dampers, namely the first damper 120 and the second damper 140. Thus, a damper device with a capacity high enough to absorb relatively large torque fluctuations (for example, relatively large torque fluctuations produced by a motor with a high output) can be achieved.

In Reference Example 1, in particular, the first damper 120 is at least partially disposed in the dead space 90 as discussed above. More specifically, as shown in FIG. 1, a part of the first spring 124 of the first damper 120 (a portion on the turbine runner 40 side in the axial direction) is disposed in the dead space 90. Thus, the capacity of the damper device 100 can be enhanced while effectively utilizing the dead space 90 which is normally not used. In addition, the length of the starting device 1 in the axial direction can be efficiently reduced compared to a configuration in which the capacity of the damper device 100 is enhanced without using the dead space 90. The first spring 124 of the first damper 120 can be disposed further radially outward by utilizing the dead space 90. This makes it possible to reduce the elastic coefficient of the first spring 124, and to reduce the rigidity of the various damper plates (such as the first damper plate 122 and the second damper plate 142).

In Reference Example 1, the power transfer path from the lock-up clutch 74 to the first damper 120 passes through the radially outer side with respect to the second damper 140. More specifically, the power transfer path from the lock-up clutch 74 to the first damper 120 passes through the outer circumferential edge portion 72 of the piston 71 and then the outer circumferential edge portion 123 of the first damper plate 122 to reach the turbine runner 40 side with respect to the second damper 140 in the axial direction. That is, the power transfer path from the lock-up clutch 74 to the first damper 120 extends from the lock-up clutch 74 side to the turbine runner 40 side across the second damper 140 in the axial direction by passing through the radially outer side with respect to the second damper 140 without penetrating through the constituent elements of the second damper 140 in the axial direction. Here, in the case where the power transfer path from the lock-up clutch 74 to the first damper 120 penetrates through the power transfer path in the second damper 140 in the axial direction, as discussed above in relation to Patent Document 2 mentioned above, it is necessary to form a space for securing the movable range of the first damper 120 in the constituent elements of the second damper 140, which is disadvantageous in terms of strength. In Reference Example 1, in contrast, it is not necessary to form a space (such as a sleeve) for securing the movable range of the first damper 120 in the constituent elements of the second damper 140, which makes it possible to improve the strength of the second damper plate 142 of the second damper 140 and so forth. In Reference Example 1, in addition, the power transfer path from the lock-up clutch 74 to the first damper 120 passes through the radially outer side with respect to the power transfer path in the second damper 140.

Figure 3:
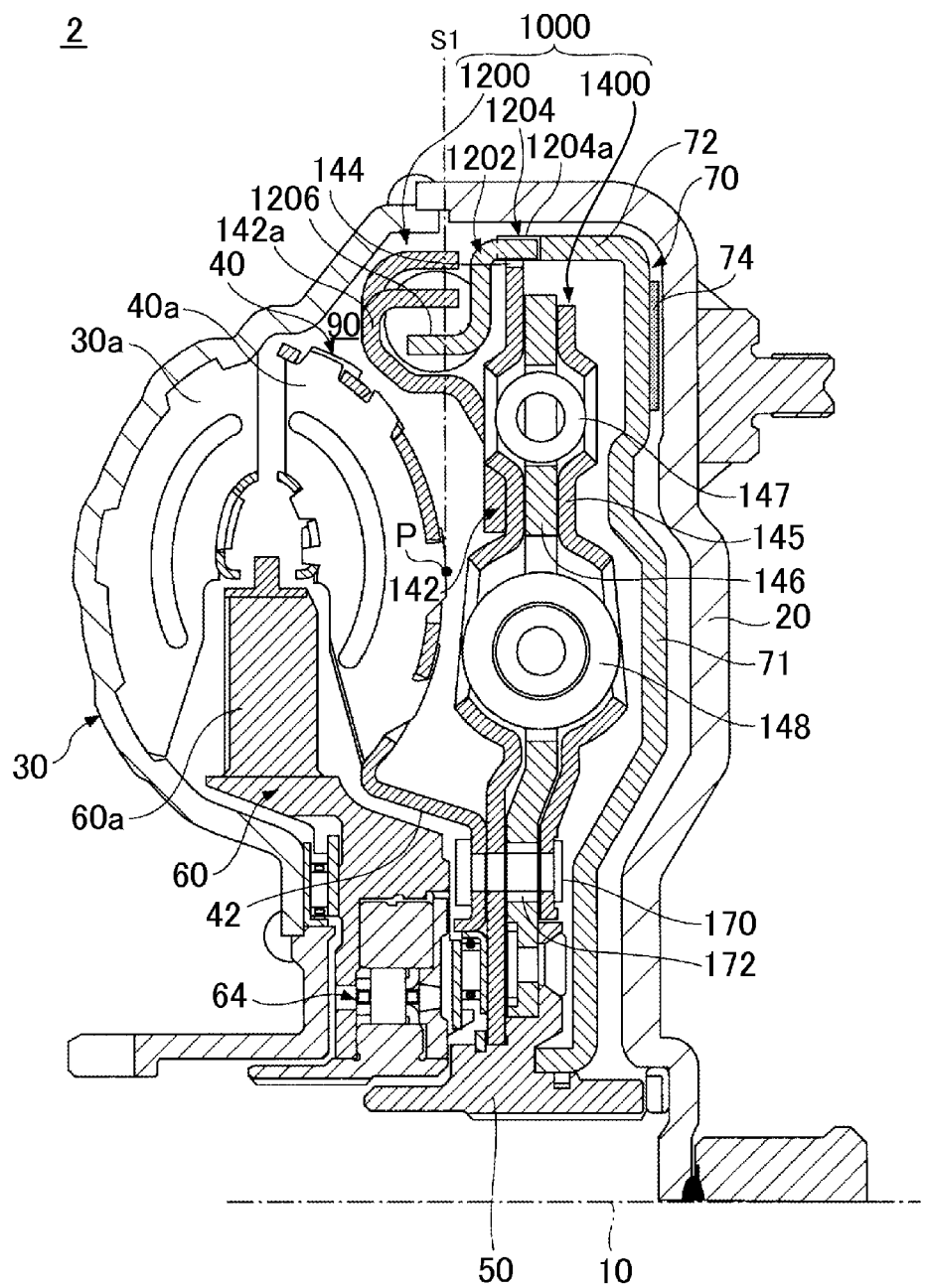
FIG. 3 is a cross-sectional view showing the configuration of an essential portion of a starting device 2 according to Reference Example 2.

FIG. 3 is a cross-sectional view showing the configuration of an essential portion of a starting device 2 according to Reference Example 2. In FIG. 3, the upper half of a cross section of the starting device 2 (the upper half above the input shaft 10) is shown. The starting device 2 according to Reference Example 2 is different from the starting device 1 according to Reference Example 1 discussed above mainly in how to hold the first spring 124. In FIG. 3, constituent elements of the starting device 2 according to Reference Example 2 that may be identical to those of the starting device 1 according to Reference Example 1 discussed above are given the same reference numerals to omit their descriptions. A damper device 1000 of the starting device 2 according to Reference Example 2 will be mainly described below.

The starting device 2 includes the damper device 1000. As shown in FIG. 3, the damper device 1000 includes a first damper 1200 and a second damper 1400.

The first damper 1200 is provided in the space 90 (dead space 90) on the outer circumferential side of the turbine runner 40 so as to partially overlap the turbine runner 40 in the axial direction.

The first damper 1200 includes a damper input member 1202 and the first spring 124. As shown in FIG. 3, the damper input member 1202 has a generally disk-like shape with a hole provided on the radially inner side. The damper input member 1202 includes an outer circumferential edge portion 1204 and a spring engagement hook 1206 that is provided on the radially inner side.

As shown in FIG. 3, the outer circumferential edge portion (power transfer portion) 1204 of the damper input member 1202 is connected to the outer circumferential edge portion 72 of the piston 71 in a manner that enables transfer of rotational torque. As shown in FIG. 3, the outer circumferential edge portion 1204 of the first damper 1200 and the outer circumferential edge portion 72 of the piston 71 extend in the axial direction so as to surround the second damper 1400 from the radially outer side. The outer circumferential edge portion 1204 of the first damper 1200 may be connected to the outer circumferential edge portion 72 of the piston 71 in the same manner of connection between the outer circumferential edge portion 123 of the first damper plate 122 and the outer circumferential edge portion 72 of the piston 71 in the starting device 1 according to Reference Example 1 discussed above (that is, with their teeth facing each other in the axial direction meshing with each other as shown in FIG. 2). Preferably, however, teeth 1204a of the outer circumferential edge portion 1204 of the first damper 1200 and the teeth 72a of the piston 71 (see FIG. 2) mesh with each other with no backlash (clearance) in the circumferential direction. This is because the damper input member 1202 according to Reference Example 2 is not supported at its radially inner end portion unlike the first damper plate 122 according to Reference Example 1 discussed above.

The spring engagement hook 1206 of the first damper 1200 extends toward the turbine runner 400 in the axial direction to engage, in the circumferential direction, with an end portion of the first spring 124 of the first damper 1200 in the circumferential direction.

The second damper 1400 includes the second damper plate 142, the third damper plate 145, the intermediate plate 146, the second spring 147, and the third spring 148. A spring holding plate 142a that holds the first spring 124 of the first damper 1200 is fixed to the second damper plate 142. The spring holding portion 142a may be formed integrally with the second damper plate 142, or may be fixed to the second damper plate 142. The spring holding plate 142a is formed in a curved shape to hold the first spring 124 from the turbine runner 40 side. The spring holding plate 142a engages, in the circumferential direction, with an end portion of the first spring 124 of the first damper 1200 in the circumferential direction. The second damper plate 142 receives power from the first damper 1200 via the spring holding plate 142a.

In the damper device 1000, power from the lock-up clutch 74 is transferred from the outer circumferential edge portion 72 of the piston 71 to the first damper 120 (the outer circumferential edge portion 1204 of the damper input member 1202). The power received from the outer circumferential edge portion 1204 of the damper input member 1202 is transferred to the second damper 1400 (the spring holding plate 142a fixed to the second damper plate 142) via the first spring 124 of the first damper 120. The power received from the spring holding plate 142a is transferred to the intermediate plate 146 of the second damper 1400 and the turbine hub 50 via the second spring 147 and the third spring 148. In this way, power is transferred from the lock-up clutch 74 to the turbine hub 50 via the damper device 1000.

The damper device 1000 according to Reference Example 2 includes two dampers, namely the first damper 1200 and the second damper 1400. Thus, a damper device with a capacity high enough to absorb relatively large torque fluctuations (for example, relatively large torque fluctuations produced by a motor with a high output) can be achieved.

In Reference Example 2, in particular, the first damper 1200 is at least partially disposed in the dead space 90 as discussed above. More specifically, as shown in FIG. 3, a part of the first spring 124 of the first damper 1200 (a portion on the turbine runner 40 side in the axial direction) is disposed in the dead space 90. Thus, the capacity of the damper device 1000 can be enhanced while effectively utilizing the dead space 90 which is normally not used. In addition, the length of the starting device 2 in the axial direction can be efficiently reduced compared to a configuration in which the capacity of the damper device 1000 is enhanced without using the dead space 90. The first spring 124 of the first damper 1200 can be disposed further radially outward by utilizing the dead space 90. This makes it possible to reduce the elastic coefficient of the first spring 124, and to reduce the rigidity of the various damper plates (such as the damper input member 1202, the second damper plate 142, and the spring holding plate 142a).

In Reference Example 2, the power transfer path from the lock-up clutch 74 to the first damper 1200 passes through the radially outer side with respect to the second damper 1400. More specifically, the power transfer path from the lock-up clutch 74 to the first damper 1200 passes through the outer circumferential edge portion 72 of the piston 71 and then the outer circumferential edge portion 1204 of the damper input member 1202 to reach the turbine runner 40 side with respect to the second damper 140 in the axial direction. That is, the power transfer path from the lock-up clutch 74 to the first damper 1200 extends from the lock-up clutch 74 side to the turbine runner 40 side across the second damper 1400 in the axial direction by passing through the radially outer side with respect to the second damper 1400 without penetrating through the constituent elements of the second damper 1400 in the axial direction. Thus, it is not necessary to form a space for securing the movable range of the first damper 1200 in the constituent elements of the second damper 1400, which makes it possible to improve the strength of the second damper plate 142 of the second damper 1400 and so forth. In Reference Example 2, in addition, the power transfer path from the lock-up clutch 74 to the first damper 1200 passes through the radially outer side with respect to the power transfer path in the second damper 1400.

Figure 4:
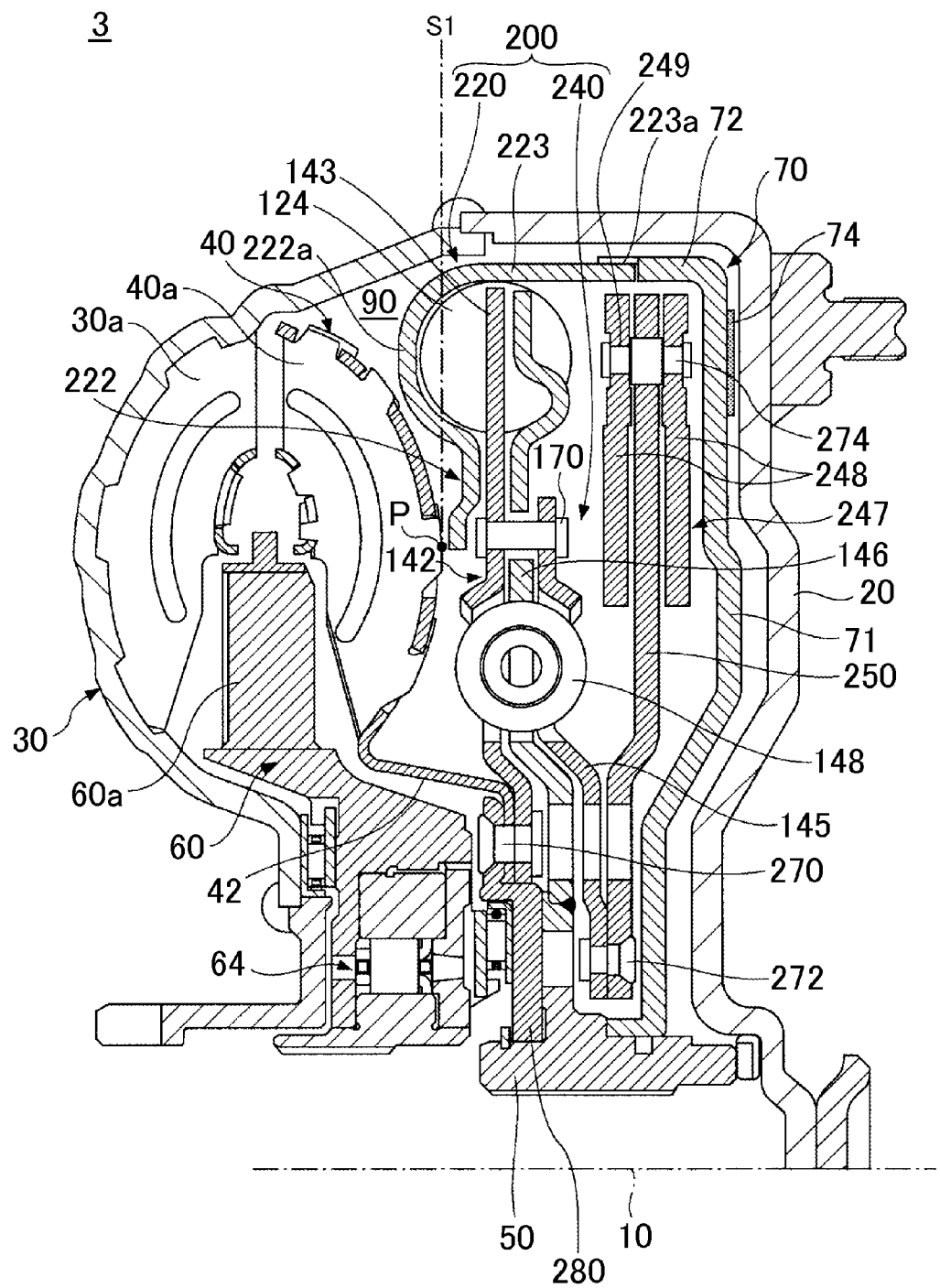
FIG. 4 is a cross-sectional view showing the configuration of an essential portion of a starting device 3 according to an embodiment (a first embodiment) of the present invention.

FIG. 4 is a cross-sectional view showing the configuration of an essential portion of a starting device 3 according to an embodiment (a first embodiment). In FIG. 4, the upper half of a cross section of the starting device 3 (the upper half above the input shaft 10) is shown. The starting device 3 according to the first embodiment is different from the starting device 1 according to Reference Example 1 discussed above in the configuration of a second damper 240 and in including a centrifugal pendulum damper (pendulum damper) 247. In FIG. 4, constituent elements of the starting device 3 according to the first embodiment that may be identical to those of the starting device 1 according to Reference Example 1 discussed above are given the same reference numerals to omit their descriptions. The peculiar configuration of the starting device 3 according to the first embodiment will be mainly described below.

The starting device 3 includes a damper device 200. As shown in FIG. 4, the damper device 200 includes a first damper 220, the second damper 240, and the centrifugal pendulum damper 247.

The first damper 220 is provided in the space 90 (dead space 90) on the outer circumferential side of the turbine runner 40 so as to partially overlap the turbine runner 40 in the axial direction.

The first damper 220 includes a first damper plate 222 and the first spring 124. As shown in FIG. 4, the first damper plate 222 has a generally disk-like shape with a hole provided on the radially inner side. The first damper plate 222 includes an outer circumferential edge portion 223 and a spring holding portion 222a that holds the first spring 124.

As shown in FIG. 4, the outer circumferential edge portion (power transfer portion) 223 of the first damper plate 222 is connected to the outer circumferential edge portion 72 of the piston 71 in a manner that enables transfer of rotational torque. As shown in FIG. 4, the outer circumferential edge portion 223 of the first damper 220 and the outer circumferential edge portion 72 of the piston 71 extend in the axial direction so as to surround the second damper 240 from the radially outer side. The outer circumferential edge portion 223 of the first damper 220 may be connected to the outer circumferential edge portion 72 of the piston 71 in the same manner of connection between the outer circumferential edge portion 123 of the first damper plate 122 and the outer circumferential edge portion 72 of the piston 71 in the starting device 1 according to Reference Example 1 discussed above (that is, with their teeth facing each other in the axial direction meshing with each other as shown in FIG. 2). Preferably, however, teeth 223a of the outer circumferential edge portion 223 of the first damper 220 and the teeth 72a of the piston 71 (see FIG. 2) mesh with each other with no backlash (clearance) in the circumferential direction. This is because the first damper plate 222 according to the first embodiment is not supported at its radially inner end portion unlike the first damper plate 122 according to Reference Example 1 discussed above. The first damper plate 222 according to the first embodiment may be supported at its radially inner end portion as with the first damper plate 122 according to Reference Example 1 discussed above. That is, the first damper plate 222 may be held between the runner shell 42 of the turbine runner 40 and the second damper plate 142 of the second damper 240.

The spring holding portion 222a of the first damper 220 is formed in a curved shape to hold the first spring 124 from the turbine runner 40 side. The spring holding portion 222a engages, in the circumferential direction, with an end portion of the first spring 124 of the first damper 220 in the circumferential direction.

The second damper 240 includes the second damper plate 142, the third damper plate 145, the intermediate plate 146, and the third spring 148. The third spring 148 is disposed on the motor side in the axial direction with respect to the first spring 124 of the first damper 220 disposed in the dead space 90. Together with a radially inner end portion of the runner shell 42, the second damper plate 142 is fixed, by a rivet 270, to a member 280 that rotates together with the turbine hub 50. The second damper plate 142 and the turbine hub 50 may be connected to each other in the same manner as in Reference Example 1 discussed above.

The centrifugal pendulum damper 247 is disposed on the motor side in the axial direction with respect to the first spring 124 of the first damper 220. In the illustrated example, the centrifugal pendulum damper 247 is disposed radially outwardly of the third spring 148, and disposed generally at the same radial position as the first spring 124 of the first damper 120. The centrifugal pendulum damper 247 produces torque that reacts against torque fluctuations of the motor. That is, the centrifugal pendulum damper 247 receives power (vibration) from the first spring 124 of the first damper 220, and transfers the power (a reacting force that cancels vibration components of the power) to the turbine hub 50 via the third damper plate 145 of the second damper 240.

In the illustrated example, the centrifugal pendulum damper 247 includes a pendulum 248 and a flange (damper plate) 250. The flange 250 has a flat disk-like shape, and extends generally in parallel with the base surface of the piston 71 (a portion on the inner circumferential side with respect to the outer circumferential edge portion 72). A radially outer portion of the flange 250 extends generally linearly to form a support portion that supports the pendulum 248. A radially inner portion of the flange 250 is coupled to the third damper plate 145 by a rivet 272. That is, the flange 250 is coupled to the third damper plate 145 on the radially inner side of the third spring 148.

The pendulum 248 may be provided at a plurality of locations (for example, four locations) in the circumferential direction of the flange 250. As shown in FIG. 4, the pendulums 248 may be provided on both sides of the flange 250 in the axial direction. The pendulums 248 each have a notched groove 249 for guiding purpose formed in a predetermined shape. A guide pin 274 is inserted into the notched groove 249. The guide pin 274 has a retaining portion, and is inserted through the flange 250 and the pendulum 248 for free rotation to be assembled so as to be rotatable along both a notched groove for guiding purpose formed in a predetermined shape in the flange 250 and the notched groove 249 for guiding purpose formed in the pendulum 248. In the case where the pendulums 248 are provided on both side surfaces of the flange 250, the clearance between the pendulums 248 is restrained by a plurality of pendulum coupling members (not shown). Thus, the pendulum 248 can relatively move in the circumferential direction with respect to the flange 250 as the guide pin 274 moves in the circumferential direction along the notched groove 249 for guiding purpose. The notched groove 249 for guiding purpose is typically formed such that the radial position of the notched groove 249 with respect to the input shaft 10 varies along the circumferential direction rather than formed concentrically with the input shaft 10. In this case, the pendulum 248 relatively moves also in the radial direction with respect to the flange 250 as the guide pin 274 moves along the notched groove 249 for guiding purpose.

In the damper device 200, power from the lock-up clutch 74 is transferred from the outer circumferential edge portion 72 of the piston 71 to the first damper 220 (the outer circumferential edge portion 223 of the first damper plate 222). The power received from the outer circumferential edge portion 223 of the first damper plate 222 is transferred to the second damper 240 (the spring engagement hook 143 of the second damper plate 142) via the first spring 124 of the first damper 220. The power received from the spring engagement hook 143 of the second damper plate 142 is subjected to a damping action exerted by the third spring 148, and transferred to the turbine hub 50. In this way, power is transferred from the lock-up clutch 74 to the turbine hub 50 via the damper device 200. In addition, torque fluctuations of the motor are damped by the action of the centrifugal pendulum damper 247 via the third damper plate 145 of the second damper 240.

More specifically, the third damper plate 145 of the second damper 240 is integrally coupled to the second damper plate 142 as discussed above to transfer (input) power from the first damper 220 to the third spring 148 of the second damper 240 in cooperation with the second damper plate 142. The intermediate plate 146, which serves as an output portion of the second damper 240, transfers the power to the turbine hub 50. Further, the flange 250 of the centrifugal pendulum damper 247 is coupled to the third damper plate 145 of the second damper 240. Thus, the third damper plate 145 is subjected to a damping action exerted by the pendulum 248 of the centrifugal pendulum damper 247 and a damping action exerted by the first spring 124 of the first damper 220. The turbine runner 40 of a fluid coupling is coupled to intermediate members (damper plates 142 and 145) of the first damper 220 and the second damper 240. Therefore, relatively high vibration is produced because of the weight of the turbine runner 40. Vibration of the turbine runner 40 can be damped by coupling the pendulum damper 247 to the same intermediate members (damper plates 142 and 145) that the turbine runner 40 is coupled to, thereby effectively damping torque fluctuations caused by vibration of the motor.

The damper device 200 according to the first embodiment includes the first damper 220, the second damper 240, and the centrifugal pendulum damper 247. Thus, a damper device with a capacity high enough to absorb relatively large torque fluctuations can be achieved.

In the first embodiment, in particular, the first damper 220 is at least partially disposed in the dead space 90 as discussed above. More specifically, as shown in FIG. 4, a part of the first spring 124 of the first damper 220 (a portion on the turbine runner 40 side in the axial direction) is disposed in the dead space 90. Thus, the capacity of the damper device 200 can be enhanced while effectively utilizing the dead space 90 which is normally not used. In addition, the length of the starting device 3 in the axial direction can be efficiently reduced compared to a configuration in which the capacity of the damper device 200 is enhanced without using the dead space 90. The first spring 124 of the first damper 220 can be disposed further radially outward by utilizing the dead space 90. This makes it possible to reduce the elastic coefficient of the first spring 124, and to reduce the rigidity of the various damper plates (such as the first damper plate 222 and the second damper plate 142).

In the first embodiment, the power transfer path from the lock-up clutch 74 to the first damper 220 passes through the radially outer side with respect to the second damper 240 and the centrifugal pendulum damper 247. More specifically, the power transfer path from the lock-up clutch 74 to the first damper 220 passes through the outer circumferential edge portion 72 of the piston 71 and then the outer circumferential edge portion 223 of the first damper plate 222 to reach the turbine runner 40 side with respect to the centrifugal pendulum damper 247 and the second damper 240 in the axial direction. That is, the power transfer path from the lock-up clutch 74 to the first damper 220 extends from the lock-up clutch 74 side to the turbine runner 40 side across the centrifugal pendulum damper 247 and the second damper 240 in the axial direction by passing through the radially outer side with respect to the centrifugal pendulum damper 247 and the second damper 240 without penetrating through the constituent elements of the centrifugal pendulum damper 247 and the second damper 240 in the axial direction. Thus, it is not necessary to form a space for securing the movable range of the first damper 220 in the constituent elements of the centrifugal pendulum damper 247 and the second damper 240, which makes it possible to improve the strength of the respective damper plates of the centrifugal pendulum damper 247 and the second damper 240 (such as the second damper plate 142). In the first embodiment, in addition, the power transfer path from the lock-up clutch 74 to the first damper 220 passes through the radially outer side with respect to the power transfer path in the second damper 240.

In the first embodiment, as discussed above, a coupling member (the outer circumferential edge portion 72 of the piston 71) that defines the power transfer path from the lock-up clutch 74 to the first damper 220 is disposed radially outwardly of the centrifugal pendulum damper 247. Thus, the degree of freedom in movable range of the pendulum 248 of the centrifugal pendulum damper 247 can be enhanced compared to a comparative configuration in which such a coupling member passes through the radially inner side of the centrifugal pendulum damper 247 (penetrates through the flange). Specifically, there is no need to consider interference between the pendulum 248 of the centrifugal pendulum damper 247 and the coupling member due to movement of the pendulum 248 toward the radially inner side with respect to the outer circumferential edge of the flange 250 of the centrifugal pendulum damper 247 (that is, relative movement of the pendulum 248 toward the radially inner side with respect to the flange 250 due to the shape of the notched groove 249 for guiding purpose). Thus, the degree of freedom in size and arrangement of the pendulum 248 of the centrifugal pendulum damper 247 can be enhanced.

In the first embodiment, as discussed above, the piston 71, the centrifugal pendulum damper 247, the first damper 220, and the fluid coupling (the pump impeller 30 and the turbine runner 40) are arranged sequentially in this order from the motor in the axial direction. Thus, the centrifugal pendulum damper 247 and the first damper 220 can be disposed efficiently in a space defined between the piston 71 and the fluid coupling in the axial direction. For example, if the centrifugal pendulum damper 247 is disposed on the fluid coupling side and the first damper 220 is disposed on the piston 71 side in contrast to the first embodiment, the movable range of the pendulum 248 of the centrifugal pendulum damper 247 is significantly restrained. Thus, a limited space can be utilized efficiently by disposing the first damper 220, which includes a portion with a curved cross section (for example, the first spring 124), in a space with curved boundaries defined on the fluid coupling side and disposing the centrifugal pendulum damper 247, which has a generally flat cross section, in a space with planar boundaries defined on the piston 71 side. Further, the second damper 240 can also be disposed in the space defined between the piston 71 and the fluid coupling as with the first damper 220. The second damper 240 may be disposed with the third spring 148 positioned on the motor side in the axial direction with respect to the first spring 124 of the first damper 220 to further enhance the space utilization efficiency.

In Reference Examples 1 and 2 and the first embodiment discussed above, the "fluid coupling" in the claims functions as the pump impeller 30 and the turbine runner 40. The "output portion of a lock-up clutch mechanism" in the claims functions as the piston 71 (and its outer circumferential edge portion 72). The "spring damper" in the claims functions as the first damper 220. The "power transfer portion of a spring damper" in the claims functions as the outer circumferential edge portion 223 of the first damper plate 222. The "power output portion of a spring damper" in the claims mainly functions as the second damper plate 142, the spring engagement hook 143, and the third damper plate 145. Here, the second damper plate 142, the spring engagement hook 143, and the third damper plate 145 are described as constituent elements of the second damper 240 in the above description. However, the second damper plate 142, the spring engagement hook 143, and the third damper plate 145 also function as output members of the first damper 220, and thus can be considered as constituent elements of the first damper 220. The "centrifugal pendulum damper" and the "pendulum power transfer portion" in the claims function as the centrifugal pendulum damper 247 and the flange 250, respectively.

Further, the "second spring damper" in the claims functions as the second damper 240. The "second power transfer portion" in the claims mainly functions as the spring engagement hook 143. The "second power output portion" in the claims functions as the intermediate plate 146. The "connection portion" in the claims functions as the second damper plate 142, the spring engagement hook 143, and the third damper plate 145.

While embodiments of the present invention have been described in detail above, the present invention is not limited to the embodiments discussed above, and various modifications and alternations may be made to the embodiments discussed above without departing from the scope of the present invention.

For example, in Reference Example 1 discussed above, a toothless portion is provided among the plurality of teeth 123a of the first damper plate 122 of the first damper 120 for the plurality of teeth 72a of the piston 71, and the stopper movable space 92 is formed for the toothless portion. However, an inverted configuration may be used. That is, a toothless portion may be provided among the plurality of teeth 72a of the piston 71 for the plurality of teeth 123a of the first damper plate 122, and the stopper movable space 92 may be formed for the toothless portion. That is, the stopper movable space 92 may be formed in a space between adjacent teeth 123a of the first damper plate 122. This also applies to Reference Example 2 and the first embodiment discussed above.

In Reference Example 1 discussed above, the outer circumferential edge portion 123 of the first damper plate 122 and the outer circumferential edge portion 72 of the piston 71 are connected to each other with their teeth facing each other in the axial direction meshing with each other as shown in FIG. 2. However, the outer circumferential edge portion 123 of the first damper plate 122 and the outer circumferential edge portion 72 of the piston 71 may be connected to each other in any other manner of connection, such as spline fitting, that enables relative movement between the outer circumferential edge portion 123 of the first damper plate 122 and the outer circumferential edge portion 72 of the piston 71 in the axial direction and that enables transfer of rotational torque. This also applies to Reference Example 2 and the first embodiment discussed above.

In Reference Examples 1 and 2 and the first embodiment discussed above, the second damper 140, 240, 1400 may have any configuration as long as the second damper 140, 240, 1400 receives power from the lock-up clutch 74 from the first damper 120, 220, 1200 to transfer the power to the turbine hub 50 via a spring or the like. For example, in Reference Examples 1 and 2 discussed above, either one of the second spring 147 and the third spring 148 may be dispensed with. Also, in the first embodiment, the second damper 240 may be dispensed with.

In Reference Examples 1 and 2 and the first embodiment discussed above, components other than the damper device 100, 200, 1000 and the piston 71 may have any configuration as long as the dead space 90 is provided on the outer circumferential side of the turbine runner 40. For example, a configuration in which the stator 60 is not provided, a configuration in which a multi-plate clutch is used in the lock-up clutch mechanism 70, and so forth may be adopted.

In Reference Example 1 discussed above, the first spring 124 of the first damper 120 is partially disposed in the dead space 90. However, the first spring 124 of the first damper 120 may be entirely disposed in the dead space 90. Alternatively, conversely, the first spring 124 of the first damper 120 may be entirely disposed outside the dead space 90 (on the motor side with respect to the plane S1). In this case, a part of a member related to the first damper 120 may be partially disposed in the dead space 90. This also applies to Reference Example 2 and the first embodiment discussed above. For example, in the case of Reference Example 1 discussed above, a part of the first damper plate 122 of the first damper 120 (in particular, the spring holding portion 122*a*) may be disposed in the dead space 90. In the case of Reference Example 2 discussed above, the spring holding plate 142*a* may be disposed in the dead space 90. In the case of the first embodiment discussed above, the spring holding portion 222*a* of the first damper plate 222 may be disposed in the dead space 90.

The invention claimed is:

1. A starting device comprising:
 a lock-up clutch mechanism that mechanically transfers power from a motor to an input shaft of a transmission;
 a fluid coupling including a turbine runner and a pump impeller to transfer power from the motor to the input shaft via a fluid;
 a spring damper including a spring, a power transfer portion that transfers power from an output portion of the lock-up clutch mechanism to the spring, and a power output portion that transfers power of the spring to the input shaft; and
 a pendulum damper including a pendulum and a pendulum power transfer portion that transfers power from the power output portion of the spring damper to the pendulum, wherein
 the output portion of the lock-up clutch mechanism, the pendulum damper, the spring damper, and the fluid coupling are arranged sequentially in this order from the motor in an axial direction, and
 the output portion of the lock-up clutch mechanism and the power transfer portion of the spring damper are connected to each other on an outer circumferential side of the pendulum damper, and the power output portion of the spring damper and the pendulum power transfer portion are connected to each other on an inner circumferential side of the pendulum.

2. The starting device according to claim 1, further comprising:
 a second spring damper including a second spring, a second power transfer portion formed integrally with the power output portion of the spring damper to transfer power from the spring damper to the second spring, and a second power output portion that transfers power of the second spring to the input shaft, wherein
 the pendulum power transfer portion of the pendulum damper is connected to the power output portion of the spring damper and the second power transfer portion of the second spring damper which function as a connection portion that connects between the first spring damper and the second spring damper.

3. The starting device according to claim 2, wherein the turbine runner is connected to the connection portion.

4. The starting device according to claim 2, wherein the second spring is disposed on a side of the motor with respect to the spring in an axial direction of the input shaft.

* * * * *